Oct. 10, 1950  C. H. CUNO  2,525,287
FILTER
Filed March 22, 1947
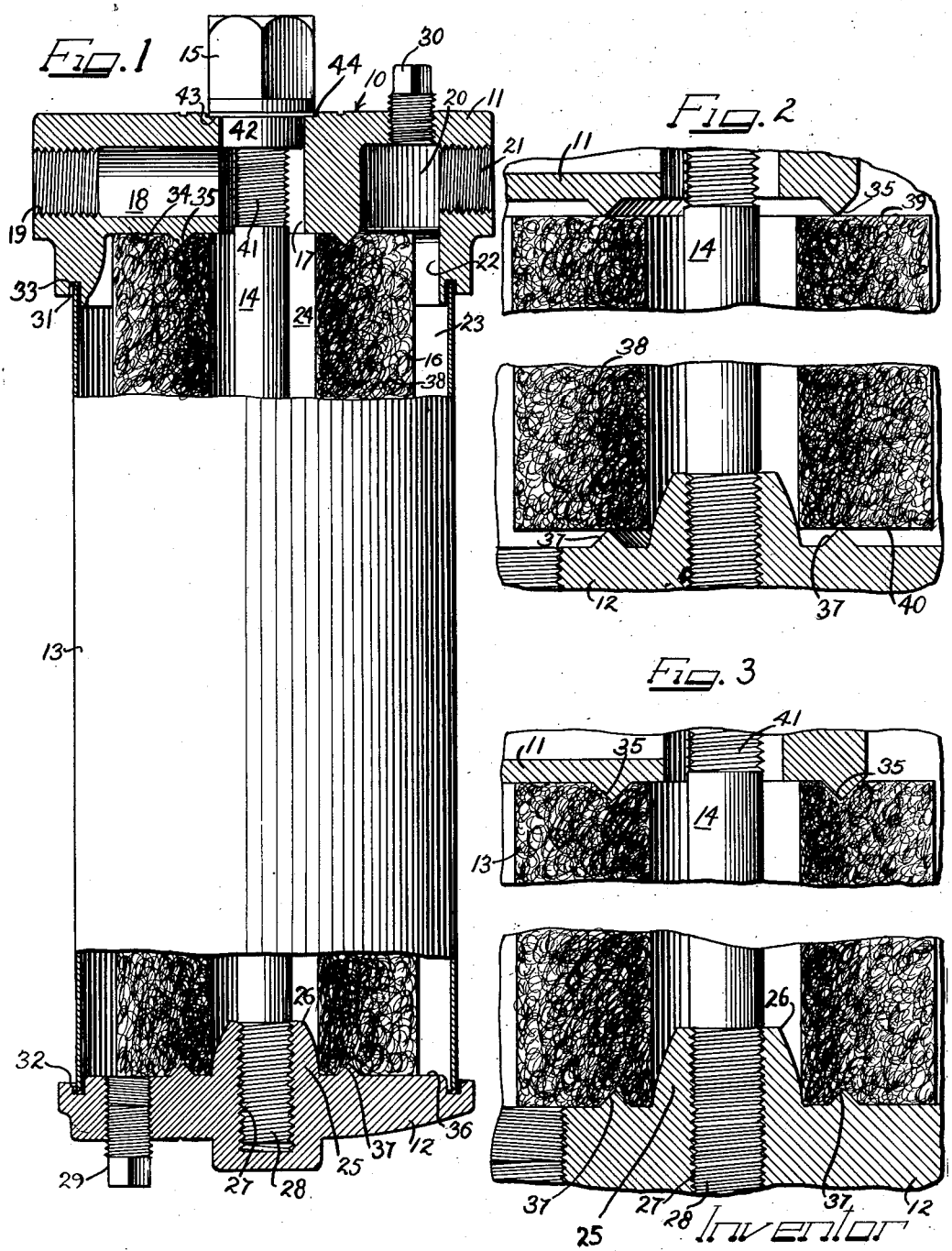
Inventor
CHARLES H. CUNO Patented Oct. 10, 1950

2,525,287

UNITED STATES PATENT OFFICE 2,525,287

FILTER

Charles H. Cuno, Meriden, Conn., assignor to The Cuno Engineering Corporation, Meriden, Conn., a corporation of Connecticut Application March 22, 1947, Serial No. 736,467

2 Claims. (Cl. 210—131)

This invention relates to a filter, and more particularly to an oil filter for use in automotive vehicles.

The filter of my present invention includes a thick-walled, tubular filter element formed of fibrous material impregnated and bonded together by means of a resinous bonding agent. The filter element consists only of such bonded fibrous material, unreenforced by metal or other fabrics. The filter element is of graded porosity, with the larger size pores toward the outer surface and the smaller size pores toward the inner surface, so as to provide greater filtering efficiency. The filter element is clamped between heads in concentric relationship to an outer shell, the space between the outer shell and the outer surface of the filter element receiving the incoming oil to be filtered, and the inner bore of the filter element providing a passage for the outgoing filtered oil.

In accordance with my present invention, the heads that serve to clamp the filter element and shell in assembled relationship are provided on their inner faces with inwardly directed annular ridges that are adapted to bite into the plane end faces of the tubular filter element to aid in positioning such filter element and in sealing the joint between the inner surfaces of the head and the end faces of the filter element. One of the heads is provided with an inwardly tapered boss that is adapted to project into one end of the bore of the filter element to aid in centering and positioning the element in place. An axially extending bolt is threaded at one end into said boss and at the other end receives a nut that serves to clamp the whole assembly in proper relationship.

It is therefore an important object of this invention to provide a filter of novel and improved construction embodying a thick-walled, tubular filter element of fibrous material tightly clamped between heads of the filter assembly.

It is a further important object of this invention to provide a filter assembly in which an outer shell and an inner, thick-walled, tubular filter element of unreenforced fibrous material are held tightly clamped and in sealing relationship to a pair of end heads, the shell and filter element providing an outer annular space for receiving the fluid to be filtered and the filter element providing an axial space for the outward flow of filtered fluid, and one of the heads being provided with an intake into said peripheral space and with an outlet in flow communication with said inner space.

Other and further important objects of this invention will be apparent from the disclosures in the specification and the accompanying drawings.

On the drawings:

Figure 1 is a longitudinal sectional view, partly in elevation, of a filter assembly embodying my invention.

Figure 2 is an enlarged, fragmentary, longitudinal sectional view illustrating the cooperation of the heads and the filter element just prior to assembly.

Figure 3 is an enlarged, broken, sectional view similar to Figure 2 but illustrating the cooperation between the same parts after assembly.

As shown on the drawings:

The reference numeral 10 indicates generally an oil filter embodying my invention. Said filter 10 comprises a pair of heads 11 and 12, a thin cylindrical shell 13 positioned between said heads, and means, including a bolt 14 and a nut 15 for assembling the shell 13 in place between the two heads. A filter element 16 is also clamped between the two heads 11 and 12 in coaxial relationship with but spaced from the shell 13.

The head 11 is provided with an axially extending smooth bore 17, through which the bolt 14 can freely pass. A transversely extending passage 18, having a threaded outer end 19 connects with the bore 17 to provide an outlet passage for the filtered fluid. Said head 11 is also provided with a second passage 20 having a laterally extending portion that is internally threaded, as at 21, and an inwardly extending portion 22 that terminates just inside the cylindrical shell 13. The passage 20 provides an inlet for the filter and opens into the annular space 23 between the filter element 16 and the shell 13. The bore 24 of the filter element itself provides a chamber for receiving the filtered fluid and is connected thru the bore 17 with the outlet passage 18.

The head 12 is provided with an axially extending boss 25, the inner portion of which is of circular cross section and of diminishing diameter inwardly to provide a surface 26 for projection into the adjacent end of the bore 24 and thus serve to center and position the filter element 16. Said boss 25 is provided with an internally threaded socket 27 for receiving the threaded end 28 of the bolt 14. A drain plug 29 is provided in the head 12. A similar drain plug 30 is provided in the head 11, so that regardless of which end of the assembly is uppermost the contents of the filter can be drained by gravity.

Both of the heads 11 and 12 are provided with annular grooves 31 and 32, in the bottoms of which are positioned gaskets 33, and into which the open ends of the cylindrical shell 13 are received. The head 11 has an inner surface 34 that is generally plane but that is provided with an inwardly directed annular ridge 35 lying within the inner and outer surfaces of the filter element 16 when the latter is in place. The head 12 is similarly provided with an inner surface 36 that is generally plane except for a similar annular ridge 37. The purposes of the ridges 35 and 37 will be later explained.

The filter element 16 is composed entirely of fibrous material, indicated at 38, impregnated and bonded together with a resinous binder. There is no reenforcing material, such as a metal fabric, associated with the filter element 16, as has been so commonly the case heretofore. The filter element 16 is formed by the aggregation of resin impregnated fibers in the manner and upon apparatus such as described in the copending application of Anderson Serial No. 745,909, filed May 5, 1947, owned by a common assignee with this application. Said filter element is so formed as to provide graded porosity radially of the filter element, the pores toward the outside of the filter element being relatively larger than those of the inside of the filter element. By reason of this graded porosity, there is less likelihood of the filter element becoming clogged and its filtering capacity and efficiency are thereby enhanced.

As originally produced the filter element 16 has plane annular end faces 39 and 40 (Fig. 2), but when the heads 11 and 12 are clamped tightly against the shell 13, as by means of the bolt 14 and nut 15, the annular ridges 35 and 37 are forced into said end faces 39 and 40, respectively, as illustrated in Figure 3. The fibrous body of the filter element 13 is sufficiently yielding to permit this penetration of the ridges 35 and 37 into said end surfaces. Said end surfaces thereby acquire corresponding annular grooves that take a permanent set owing to the lack of resiliency of the fibrous material and the compressibility of such material under heavy loads. Said ridges 35 and 37 thus serve in conjunction with the centering boss surface 26 to properly position the filter element in place and to maintain the same against displacement or deformation under the differential fluid pressure existing between the outside and the inside of the filter element. The end surfaces of the filter element, in cooperation with the end surfaces of the heads, also serve as their own sealing surfaces, requiring no gasket or other sealing means to provide a fluid seal.

The bolt 14 extends the full length of the bore 24 of the filter element and is provided with a threaded end 41 that extends into the smooth bore 17 of the head 11 and is substantially spaced from the inner surface of said bore. The nut 15 is provided with an inner cylindrical portion 42 that fits freely into the smooth bore 17 and that, in conjunction with the head of said nut 15, provides an annular shoulder 43 adapted to seat against the lower surface of an annular recess 44 formed in the outer end face of said head 11 for that purpose. Thus, by tightening up on the nut 15, the various parts of the assembly can be tightly clamped together under the force necessary to cause the annular ridges 35 and 37 to bite into the end faces of the filter element and to effect a fluid seal therebetween and also between the ends of the shell 13 and the gasket 33 in the grooves 31 and 32. By the same token, the filter can be taken apart by merely unscrewing the nut 15.

In the case of the use of the filter as an oil filter, oil is introduced into the inlet passage 20 under the pressure of the oil pump to fill the outer space 23 between the shell 13 and the outer cylindrical surface of the filter element 16. The oil filters inwardly through the filter element 16 until it reaches the inner annular space 24 between the bolt 14 and the inner surface of bore of the filter element. The oil then proceeds axially toward the outlet passage 18 into the tubing connected to the threaded portion 19 of said passage.

It will be understood that various details of construction may be varied through a wide range without departing from the principles of this invention and it is, therefore, not the purpose to limit the patent granted hereon otherwise than necessitated by the scope of the appended claims.

I claim as my invention:

1. A filter comprising a thin open-ended cylindrical shell, a head having a central inwardly tapered boss provided with a threaded socket, a second head having a smooth bore extending axially therethrough, a transverse passage opening into said bore to provide a fluid outlet from the center of said head and a second transverse passage opening on the inside of said head near the periphery thereof to provide a fluid intake, a thick-walled tubular filter element of substantially less outer diameter than said shell having a cylindrical opening therethrough larger than said bore and having plane end faces, said tapered boss extending into one end of said cylindrical opening to center said element, both of said heads having annular grooves for receiving the ends of said shell and having annular ridges on their inner faces for biting into the end faces of said filter element, said annular grooves having gaskets in the bottoms thereof, a bolt having one end threaded into said socket with the other end terminating in said bore and provided with threads, and a nut having an annular shoulder bearing against the outer surface of said second head and secured on said bolt end threads to clamp said shell and filter element between said heads, said filter element being compressed between said heads to seal the end faces of said element in contact with said heads to prevent the leakage of fluid therebetween.

2. A filter comprising a thin open-ended cylindrical shell, a pair of heads closing the ends of said shell, one of said heads having a central inwardly tapered boss provided with a threaded socket, the other of said heads having a smooth bore extending axially, a transverse passage opening into said bore to provide a fluid outlet from the center of said head and a second transverse passage opening on the inside of said head near the periphery thereof to provide a fluid intake, a thick-walled tubular filter element of substantially less outer diameter than the diameter of said shell having a cylindrical opening therethrough at least as large as said bore and having plane end faces, said tapered boss extending into one end of said cylindrical opening to center said element, both of said heads having annular ridges on their inner faces for biting into the end faces of said filter element, a bolt having one end threaded into said socket with the other end terminating in said bore and provided with threads, and a nut having an annular shoulder bearing against the outer surface of the other of said heads and secured on said bolt end threads to clamp said shell and filter element between said heads, said filter element being compressed between said heads to seal the end faces of said element in contact with said heads to prevent the leakage of fluid therebetween.

CHARLES H. CUNO.

REFERENCES CITED

The following references are of record in the file of this patent:

UNITED STATES PATENTS

| Number | Name | Date |
|---|---|---|
| 661,373 | Jandus | Nov. 6, 1900 |
| 1,710,758 | Wright | Apr. 30, 1929 |
| 2,110,318 | Baruch | Mar. 8, 1938 |
| 2,218,339 | Manning | Oct. 15, 1940 |
| 2,339,703 | Kamrath | Jan. 18, 1944 |

FOREIGN PATENTS

| Number | Country | Date |
|---|---|---|
| 2,931 | Great Britain | of 1897 |
| 587,615 | Germany | Nov. 6, 1933 |